Sept. 17, 1957 R. H. SMITH 2,806,949
GATED PULSE GENERATOR
Filed March 30, 1955
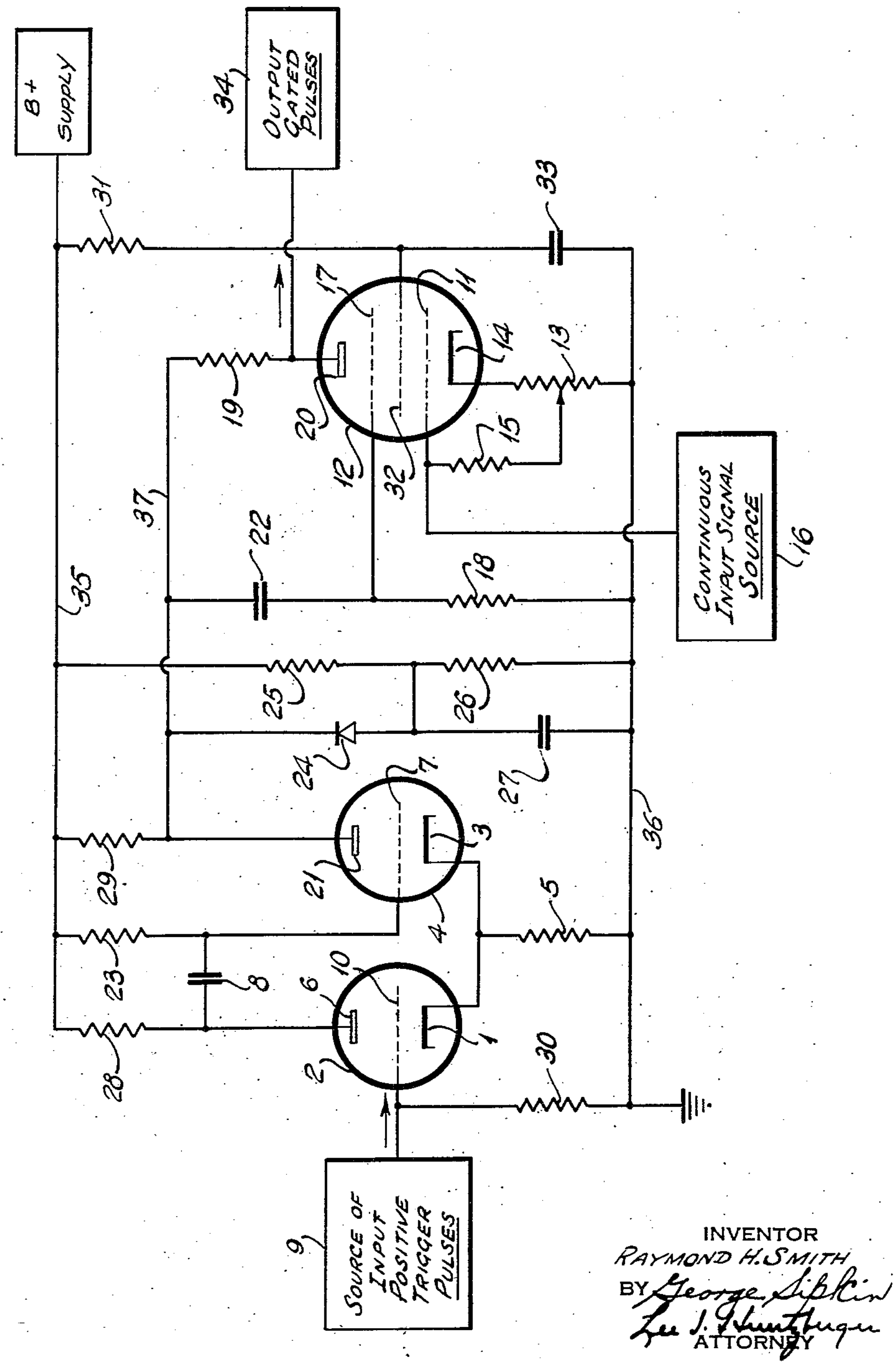
INVENTOR
RAYMOND H. SMITH
BY George Sipkin
Lee J. Hunt...
ATTORNEY United States Patent Office 2,806,949
Patented Sept. 17, 1957

2,806,949

GATED PULSE GENERATOR

Raymond H. Smith, Waterford, Conn., assignor to the United States of America as represented by the Secretary of the Navy Application March 30, 1955, Serial No. 498,123
9 Claims. (Cl. 250—27)
(Granted under Title 35, U. S. Code (1952), sec. 266)

The invention described herein may be manufactured and used by or for the Government of the United States of America for governmental purposes without the payment of any royalties thereon or therefor.

This invention concerns gated pulse generators of the electron tube type.

A gated pulse generator of the prior art utilizes a pentode tube; the control grid is biased for normal amplifier application, the suppressor grid is biased to, or beyond, the cutoff point and the tube is in a non-conductive state. A steady state signal is applied to the first, or control grid, at the frequency of the desired pulse. A resistive, non-reactive, load is used at the plate of the tube to prevent the gain of the stage from varying with changes in frequency. A positive voltage is applied to the third, or suppressor grid, for the desired pulse duration; the positive voltage is of sufficient amplitude to overcome the fixed negative bias on the suppressor grid. The pentode amplifies the signal applied at the control grid together with the voltage at the suppressor.

The signal appearing at the control grid and the gating pulse appearing at the suppressor grid, of the pentode type gated pulse generator, are amplified together; this results in incorporating an interfering signal or switching transient in the output, which signal is a reproduction of the signal appearing at the suppressor grid. It is very difficult to remove this interference without seriously affecting the desired signal.

A gated pulse generator of the prior art is a keyed oscillator; an oscillator, tuned to the desired frequency, is turned successively on and off for the desired pulse duration. The gated signal may not be started and stopped where desired and may not be controlled to as close a frequency tolerance as required.

A gated pulse generator of the prior art may be of the relay type. The transfer time of the relays due to mechanical inertia may render the instrument useless. Furthermore, transfer time allows time errors to be introduced and any transients or bounces appear as a portion of the desired signal and produce erroneous results.

Gated pulse generators of the prior art add undesirable signals to the original signals to produce impure pulses, thereby impairing the usefulness of the resulting pulses. Also, they are not adaptable to a wide variation of pulse lengths without adverse effects.

The principal object of this invention is the provision of a gated pulse generator producing output pulses which are a true reproduction of the original signal.

An object of this invention is the provision of a gated pulse generator having a constant D. C. output level.

An object of this invention is the provision of a gated pulse generator producing A. C. output pulses of predetermined duration and repetition rate.

An object of this invention is the provision of a gated pulse generator producing output pulses adaptable to a wide variation of pulse lengths without adverse effects.

An object of this invention is the provision of a gated pulse generator producing output pulses having constant amplitude for any desired duration devoid of interference or transients.

An object of this invention is the provision of a gated pulse generator producing output pulses which are started and stopped at any phase angle.

An object of this invention is the provision of a gated pulse generator producing output pulses controllable to as close a frequency tolerance as required.

An object of this invention is the provision of a gated pulse generator producing output pulses unimpaired in fidelity.

An object of this invention is the provision of a gated pulse generator instantaneous in operation and operating a linear amplifier during the gating period.

Another object of this invention is the provision of a gated pulse generator producing controllable output pulses of a duration equal to that of the driving pulse.

A further object of this invention is the provision of a gated pulse generator producing A. C. output pulses of square wave type.

Still a further object of this invention is the provision of a gated pulse generator producing output pulses of duration continuously variable from one tenth of a millisecond to one second.

Other objects and many of the attendant advantages of this invention will be readily appreciated as the same becomes better understood by reference to the following detailed description when considered in connection with the accompanying drawing wherein:

The gated pulse generator of the present invention comprises a "one-shot" multivibrator directly coupled to a gated amplifier. The gated amplifier tube, a pentode, together with its plate load resistor, is shunted across one section of the two-triode "one-shot" multivibrator in such a manner as to maintain a constant D. C. potential at the plate of the gated amplifier pentode. The signal to be pulsed is connected to the control grid of the gated amplifier pentode. The application of sufficient bias to the suppressor grid of the gated amplifier pentode maintains the pentode usually at cutoff. The gating time is established by coupling a positive pulse section of the multivibrator to the suppressor grid of the gated amplifier pentode. The pulse duration is controlled by an RC network in the multivibrator, and it is continuously variable from one tenth of a millisecond to one second. The triggering pulse for the multivibrator is derived from an external source. The gated amplifier output may be coupled to a cathode follower in order to secure isolation of the gated amplifier and a low impedance output.

The figure is the circuit of the gated pulse generator of the present invention.

The cathode 1 of the input triode tube 2 is coupled to the cathode 3 of the output triode tube 4 through a common cathode resistor 5. The plate 6 of the input triode 2 is connected to the cathode-to-plate line 35 through the plate load resistor 28 and the plate 21 of the output triode 4 is connected to the cathode to plate line 35 through the plate load resistor 29. The grid 7 of the output triode 4 is connected to the cathode to plate line 35 through the grid load resistor 23; the plate 6 of the input triode 2 is coupled to the grid 7 of the output triode 4 through the capacitor 8. A source of input positive trigger pulses 9 applies its output to the grid 10 of the input triode 2. The grid 10 of the input triode 2 is grounded through the grid return resistor 30.

The first grid, or control grid 11, of the pentode tube 12, is returned to a suitable tap on the cathode resistor 13 of the cathode 14 through the resistor 15. A continuous input signal source 16 applies its output to the control grid 11 of the pentode 12. The second grid, or screen grid 32, is connected to the cathode to plate line 35 between the screen grid dropping resistor 31 and the by-pass capacitor 33. The third grid, or suppressor grid 17, of the pentode 12, is returned to ground through the resistor 18 which is connected to the common cathode line 36.

The cathode to plate line 35 runs from the cathode 14 of the pentode 12 to the plate 6 of the input triode 2. The common cathode line 36 runs from the cathode 14 of the pentode 12 to the ground line of the input triode grid 10. A common plate line 37 runs from the plate 20 of the pentode 12 to the plate 21 of the output triode 4.

The plate resistor 19 is in the common plate line 37. A pentode shunt line, at the pentode input, is connected between the common cathode line 36 and the common plate line 37. The coupling capacitor 22 in the pentode shunt line is connected to the resistor 18 in the shunt line. The suppressor grid 17, of the pentode 12 is connected to the pentode shunt line between the capacitor 22 and the resistor 18, thus coupling the plate 21 of the output triode 4 to the suppressor grid 17. The output gated pulses 34 are removed from the plate 20 of the pentode 12.

A triode shunt line, at the output triode output, is connected between the common cathode line 36 and the common uplate line 37. The rectifier 24 and the by-pass capacitor 27 are connected together in the triode shunt line. The triode shunt line is biased by the bias shunt line through a direct connection between said lines. The bias shunt line is connected between the common cathode line 36 and the cathode to plate line 35. The resistors 25 and 26 of the bias shunt line provide the triode shunt line bias.

The operation of the gated pulse generator of the present invention is as follows.

The triodes 2 and 4 are connected as a "one-shot" multivibrator, well known in the prior art. A "one-shot" multivibrator is essentially a two-stage resistance-capacitance-coupled amplifier with one tube cut off and the other tube normally conducting. In a manner known in the art, every positive trigger pulse, from the source of input positive trigger pulses 9, which causes the input triode 2 to conduct, applied to the input of the one-shot multivibrator, produces a large positive pulse output in the plate circuit of the output triode 4. The duration of the positive output pulse produced at the plate of the output triode 4 is controlled by the time constant of the capacitor 8 and the resistor 23. If large values of capacitor 8 and resistor 23 are used, the duration of the positive output pulse is increased. A positive output voltage pulse is produced for each input positive trigger pulse, regardless of how frequently it occurs.

The pulse multivibrator triode tubes 2 and 4 are initiated by the application of an input positive trigger pulse to the grid 10 of the input triode 2. The input positive trigger pulse is produced by the source of input positive trigger pulses 9, which may be any positive pulse source known in the art, e. g., a battery, a blocking oscillator, a differentiated square wave generator, a thyratron discharge or any suitable sharp positive pulse source.

After the two triodes are initiated in operation by a sharp positive trigger pulse applied to the grid 10 of the input triode 2, a negative square pulse appears at the plate 6 of the input triode 2 and a positive square pulse appears at the plate 21 of the output triode 4. A positive square pulse appears at the suppressor grid 17 of the pentode 12. The duration of these pulses is dependent upon the constants of the capacitor 8 and the resistor 23.

The operation of the multivibrator circuit is known in the art. Initially, the input triode 2 is cut off by the voltage drop produced across the resistor 5 by the plate current of the output triode 4. The output triode 4 conducts heavily because of its grid potential. The application of a positive pulse, having sufficient amplitude to raise the grid of the input triode 2 above cutoff voltage, to the grid 10 of the triode 2, initiates conduction in triode 2.

As the input triode 2 begins to conduct, the voltage at its plate 6 decreases, passes through the capacitor 8, and appears on the grid 7 of the output triode 4 as a negative going voltage. The negative going voltage on the grid of the output triode 4 decreases the plate current of triode 4. The voltage drop across the resistor 5 decreases, allowing more current to flow in the input triode 2. The plate voltage of the input triode 2 is still further decreased and the grid of the output triode 4 goes still more negative. The operation described for the multivibrator is repeated until the output triode 4 is cut off and the input triode 2 is conducting. The action is practically instantaneous.

The multivibrator circuit remains with the input triode 2 conducting and the output triode 4 cut off, during the interval of positive pulse duration at the plate of the triode 4, while the capacitor 8 discharges sufficiently toward the lowered value of plate voltage of the triode 2 to allow the grid of the triode 4 to rise from its lowest value to cutoff voltage. Then the triode 4 begins to conduct; the plate current of the triode 4, flowing through the resistor 5, raises the cathode voltage of the triode 2, thus reducing its plate current. The decreased plate current of the triode 2 allows its plate voltage to increase and this increase is coupled to the grid of the triode 4, increasing its plate current still further. This action is repeated until the input triode 2 is cut off and the output triode 4 is conducting heavily. This action also is practically instantaneous.

The multivibrator circuit is now back in its original balanced state and remains so until another positive input trigger pulse arrives and causes the input triode 2 to conduct.

The pentode tube 12 operates as a gated amplifier and is initially cut off so that no signal appears at its plate 20 regardless of what occurs at its control grid 11. The control grid 11 of the pentode 12 is biased for usual amplifier application by being returned to a suitable tap on the cathode resistor 13 through the resistor 15. The continuous input signal source 16 produces a continuous signal having the characteristic waveform desired in the output signal pulses and applies said signal to the control grid 11 of the pentode 12. The input signal source 16 may be any suitable signal source known in the art. The cathode resistor 13 is made sufficiently large so that the current on the screen grid 32 of the pentode 12 produces a sufficient voltage drop across the cathode resistor 13; this makes the suppressor grid 17 bias sufficient to cut off the plate current of the pentode 12.

The plate 20 of the pentode 12 is held at some potential below supply since it is directly coupled to the output triode 4. The grid 7 of the output triode 4 has a positive voltage applied to it, allowing said triode to conduct heavily. Instantaneous with the triggering of the input triode 2, the output triode 4 is transformed from a conducting to a non-conducting state.

As the plate voltage of the output triode 4 rises, it is coupled to the suppressor grid 17 of the pentode 12 by the capacitor 22, causing the pentode to start conducting; this tends to decrease the plate voltage of the pentode. The resistors 19 and 29, as well as the tube parameters, are so selected that the D. C. plate potential of the pentode remains constant whether said pentode is being gated or not. As the plate voltage of the pentode 12 starts becoming negative, the plate voltage of the output triode 4 simultaneously starts becoming positive, with a net result that the plate voltage of the pentode remains essentially constant.

The pentode 12 amplified the signal appearing at its control grid 11 for as long as a positive pulse is applied to its suppressor grid 17; a pulse is applied to the suppressor grid as long as the triode 4 remains cut off. The pentode thus produces output pulses of predetermined duration from the continuous input signal applied by the continuous input signal source 16; the output gated pulses are a true reproduction of the continuous input signal. The continuous input signal may be of any suitable origin or configuration; it may be sinusoidal, complex or noise in form.

When the output triode 4 starts conducting, initial conditions are present and there is no pulse applied to the suppressor grid 17 of the pentode 12; the pentode returns to its initial non-conducting condition and there is no output gated pulse produced.

The rectifier 24 is biased by the combination of resistors 25 and 26 so that any overshoot of voltage occurring as the output triode 4 returns to its initial conducting condition is by-passed to ground by the capacitor 27.

The gated pulse generator of the present invention thus produces a pulse which is a true reproduction of an input signal of any character applied to the control grid 11 of the gated amplifier pentode 12. The duration of the output gated pulses is determined by the selection of the capacitor 8 and the resistor 23 and a pulse is produced so long as a positive pulse is applied to the grid 10 of the input triode 2. The resistors 19 and 29 aid in maintaining a constant D. C. output level at the plate 20 of the gated amplifier pentode 12.

Obviously, many modifications and variations of the present invention are possible in the light of the above teachings. It is therefore to be understood that within the scope of the appended claims the invention may be practiced otherwise than as specifically described.

I claim:

1. A gated pulse generator comprising an electronic signal amplifier biased beyond cutoff and including a plate load, an output terminal at the plate end of said plate load, said amplifier adapted to be rendered conductive by a gating pulse, normally conductive means normally conducting one level of current adapted to be rendered momentarily nonconductive, said normally conductive means connected to said plate load intermediate the ends thereof whereby current flows through a portion of said plate load to said normally conductive means, pulse coupling means connected to said plate load and said amplifier for coupling gating pulses into said amplifier, a gating pulse being produced when said normally conductive means is rendered momentarily nonconductive, the portions of said plate load to each side of the connection with said normally conductive means being of relative values such that said amplifier transmits the signal and does not transmit the gating pulse.

2. A gated pulse amplifier as defined in claim 1 wherein said plate load is a pure resistance whereby it does not introduce frequency distortion.

3. A gated pulse generator as defined in claim 2 wherein said electronic signal amplifier includes one grid for connection to a signal source and another grid connected to said pulse coupling means.

4. A gated pulse generator as defined in claim 2 wherein said electronic signal amplifier is a pentode amplifier having a cathode bias resistor, the control grid being adapted for connection to a signal source, the suppressor grid being connected to said pulse coupling means and the screen grid being biased so that screen current flows continuously, whereby the screen current flowing through said cathode resistor provides cutoff bias for said amplifier in the absence of a gating pulse on the suppressor grid.

5. A gated pulse generator as defined in claim 4 further including additional means connected to said normally conductive means, whereby the combination of said additional means, said normally conductive means and the portion of said plate load through which flows the current to said normally conductive means, comprise a one-hot multivibrator.

6. A gated pulse generator as defined in claim 5 further including biased diode means connected to the connection between said plate load and said normally conductive means to prevent overshoot in said gating pulses.

7. A gated pulse generator as defined in claim 2 further including additional means connected to said normally conductive means whereby the combination of said additional means, said normally conductive means and the portion of said plate load through which flow the current to said normally conductive means, comprise a one-shot multivibrator.

8. A gated pulse generator as defined in claim 7 further including biased diode means connected to the connection between said plate load and said normally conductive means to prevent overshoot in said gating pulses.

9. A gated pulse generator comprising an electronic discharge tube having an anode, a suppressor grid, a screen grid, a control grid and a cathode, a first resistance means connected at one end to said cathode, a second resistance means connected at one end to said control grid and at its other end to said first resistance means intermediate the ends thereof, a third resistance means connected at one end to said screen grid, a bypass condenser connected at one end to said screen grid, a fourth resistance means connected at one end to said suppressor grid, fifth resistance means connected at one end to said anode, the other ends of said first and fourth resistance means and said bypass condenser being adapted for connection to the negative terminal of a direct current power supply, the other ends of said third and fifth resistance means being adapted for connection to the positive terminal of the power supply, said control grid being adapted for connection to a signal source, said first resistance means being large enough so that in the absence of an input gating pulse to said suppressor grid the anode current is zero due to the cutoff bias arising from screen grid current flowing through said first resistance means; a first triode, the anode of said first triode being connected to said fifth resistance means intermediate the ends thereof, sixth resistance means connected at one end to the grid of said triode and adapted for connection at its other end to the positive terminal of the power supply, a seventh resistance means connected at one end to the cathode of said first triode and at its other end adapted for connection to the negative terminal of the power supply, a pulse coupling condenser connected at one end to the anode of said first triode and at its other end to said suppressor grid, a second triode, the cathode of said second triode being connected to the cathode of said first triode, a condenser connected at one end to the plate of said second triode and at the other end to the control grid of said first triode, an eighth resistance means connected at one end to the plate of said second triode and at the other end adapted for connection to the positive terminal of the power supply, the control grid of said second triode being adapted for connection to a trigger pulse source, resistive voltage divider means adapted for connection between the positive and negative terminals of the power supply, an overshoot preventing diode whose cathode end is connected to the anode of said first triode and whose anode end is connected to said resistive voltage divider intermediate the ends thereof, and a bypass condenser connected at one end to the anode end of said diode and at its other end adapted for connection to the negative terminal of the power supply; whereby said first triode is normally conductive but is cut off for a predetermined period when a trigger pulse is applied to said second triode and while said first triode is cut off, signal input to the control grid of said pentode is amplified and appears at the anode of said pentode without modification by the gating pulse applied to its suppressor grid, as a consequence of the relative resistances of the portions of said fifth resistance means to either side of the connection of the anode of said first triode to said fifth resistance means.

References Cited in the file of this patent

UNITED STATES PATENTS

| | | |
|---|---|---|
| 2,521,824 | Brown | Sept. 12, 1950 |
| 2,530,033 | Scoles | Nov. 14, 1950 |
| 2,532,566 | Millman | Dec. 5, 1950 |
| 2,570,225 | Felker | Oct. 9, 1951 |